United States Patent
Baldemair et al.

(10) Patent No.: US 8,675,632 B2
(45) Date of Patent: Mar. 18, 2014

(54) SIGNALLING OF REFERENCE SIGNALS FOR SINGLE USER SPATIAL MULTIPLEXING TRANSMISSION SCHEMES

(75) Inventors: Robert Baldemair, Solna (SE); David Astely, Bromma (SE); Bo Göransson, Sollentuna (SE); George Jongren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 13/382,035

(22) PCT Filed: Jul. 10, 2009

(86) PCT No.: PCT/EP2009/005013
§ 371 (c)(1),
(2), (4) Date: Mar. 26, 2012

(87) PCT Pub. No.: WO2011/003433
PCT Pub. Date: Jan. 13, 2011

(65) Prior Publication Data
US 2012/0176981 A1    Jul. 12, 2012

(51) Int. Cl.
*H04J 3/24* (2006.01)
(52) U.S. Cl.
USPC .......................................... 370/349; 370/334
(58) Field of Classification Search
USPC ............... 370/349, 310, 310.2, 328, 334, 338
See application file for complete search history.

(56) References Cited

U.S. PATENT DOCUMENTS

2006/0209739 A1 * 9/2006 Kumar et al. ................. 370/320
2007/0253465 A1 * 11/2007 Muharemovic et al. ...... 375/130
2008/0232307 A1    9/2008 Pi et al.
2008/0318608 A1   12/2008 Inoue et al.
2009/0073944 A1 *  3/2009 Jiang et al. ................... 370/338

FOREIGN PATENT DOCUMENTS

| EP | 2 007 021 | 12/2008 |
| EP | 2432135 | 3/2012 |
| JP | 2010-525708 | 7/2010 |

(Continued)

OTHER PUBLICATIONS

International Search Report for PCT/EP2009/005013, mailed Apr. 20, 2010.

(Continued)

*Primary Examiner* — Brenda H Pham
(74) *Attorney, Agent, or Firm* — Nixon & Vanderhye P.C.

(57) ABSTRACT

The present disclosure relates to signalling of reference signals for Multi Input Multi Output (MIMO) transmission schemes. A method embodiment for generating reference signals for use between a mobile terminal 10 and an access node 20 in a cellular communication network 100 comprises receiving, by the mobile terminal 10, a cyclic shift set indicator; selecting, from a group of cyclic shift sets, a cyclic shift set based on the received cyclic shift set indicator, each cyclic shift set comprising at least two parameters each indicating a cyclic shift; and generating, based on at least two parameters of the selected cyclic shift set, at least two orthogonal reference signals for at least two layers of a Single User Spatial Multiplexing transmission scheme to be simultaneously transmitted. A further method embodiment comprises selecting, from a plurality of groups of cyclic shift sets, a group of cyclic shift sets based on at least one of a transmission rank, being the number of layers to be simultaneously transmitted, and a number of configured antennas of the mobile terminal 10.

23 Claims, 5 Drawing Sheets

(56) References Cited

FOREIGN PATENT DOCUMENTS

| | | |
|---|---|---|
| JP | 2012-518960 | 8/2012 |
| JP | 2012-526506 | 10/2012 |
| WO | WO 2008/117967 | 10/2008 |
| WO | WO 2008/132073 | 11/2008 |
| WO | WO 2010/097121 | 9/2010 |

OTHER PUBLICATIONS

Written Opinion for PCT/EP2009/005013, mailed Apr. 20, 2010.
International Preliminary Report on Patentability for PCT/EP2009/005013, completed Aug. 23, 2011.
Nortel, "Evaluation of transmit diversity for PUCCH in LTE-A", *3GPP Draft,* Mar. 17, 2009, p. 3.
Nortel, "Evaluation of transmit diversity for PUCCH in LTE-A", *3GPP Draft,* Apr. 28, 2009, p. 3.
Texas Instruments, "Further Analysis on Uplink SU-MIMO for E-UTRA", Feb. 3, 2009 (No pages—whole document).
Texas Instruments, "Uplink SU-MIMO for E-UTRA", Jun. 24, 2008 (No pages—whole document).
Ericsson, "PUSCH RS", *3GPP Draft,* Aug. 15, 2007 (No pages—whole document).
English Summary of Japanese Office Action mailed Sep. 20, 2013 in Japanese Application No. 2012-518757.

\* cited by examiner

| cyclic shift set indicator | $n^{(2)}_{DMRS}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

| cyclic shift set indicator | $n^{(2)}_{DMRS}$ |
|---|---|
| 000 | {0, 6} |
| 001 | {1, 7} |
| 010 | {2, 8} |
| 011 | {3, 9} |
| 100 | {4, 10} |
| 101 | {5, 11} |
| 110 | {0, 3} |
| 111 | {6, 9} |

Fig. 4a

| cyclic shift set indicator | $n^{(2)}_{DMRS}$ |
|---|---|
| 000 | {0, 4, 8} |
| 001 | {1, 5, 9} |
| 010 | {2, 6, 10} |
| 011 | {3, 7, 11} |
| 100 | {0, 5, 10} |
| 101 | {1, 3, 8} |
| 110 | {4, 6, 11} |
| 111 | {2, 7, 9} |

Fig. 4b

| cyclic shift set indicator | $n^{(2)}_{DMRS}$ |
|---|---|
| 000 | {0, 3, 6, 9} |
| 001 | {1, 4, 7, 10} |
| 010 | {2, 5, 8, 11} |
| 011 | {0, 3, 5, 10} |
| 100 | {1, 6, 8, 11} |
| 101 | {2, 4, 7, 9} |
| 110 | {0, 2, 7, 9} |
| 111 | {1, 4, 6, 11} |

Fig. 4c

SIGNALLING OF REFERENCE SIGNALS FOR SINGLE USER SPATIAL MULTIPLEXING TRANSMISSION SCHEMES

This application is the U.S. national phase of International Application No. PCT/EP2009/005013 filed 10 Jul. 2009 which designated the U.S., the entire contents of which is hereby incorporated by reference.

TECHNICAL FIELD

The invention relates to signalling of reference signals for Single User Spatial Multiplexing transmission schemes. More particularly, the invention relates to the generation of cyclically shifted reference signals.

BACKGROUND

The current Long Term Evolution (LTE) standard only specifies uplink (UL) trans-missions from a single antenna at a time. This framework allows for Multi User Multi Input Multi Output (MU-MIMO) transmission schemes or spatial domain multiple access, i.e. simultaneous transmission of multiple mobile terminals on the same time-frequency resources. From a terminal perspective, this transmission mode is the same as the standard single-antenna UL transmission, only the base station is required to implement a special receiver.

In order to estimate the propagation channels between the various terminals and the base station used for MU-MIMO transmission schemes, mutually orthogonal reference signals are needed. In the LTE standard, these orthogonal reference signals $r^{(\alpha)}(n)$ are defined in the frequency domain as shown in equation (1):

$$r^{(\alpha)}(n) = e^{j\alpha n} \times \bar{r}(n), n=0,1,\ldots,M_{SC}^{RS}-1, \quad (1)$$

with $M_{SC}^{RS} = mN_{SC}^{RB}$ being the number of allocated subcarriers and $\bar{r}(n)$ being a cell specific base sequence.

Since $\alpha = 2\pi n_{CS}/12$, the multiplication of the cell specific base sequence $\bar{r}(n)$ with the complex exponential function in the frequency domain results in a cyclic shift of $n_{CS} \ast N/12$ samples of the time domain base sequence, wherein $N$ is the size of the Inverse Discrete Fourier Transform (IDFT) used in the modulator and $n_{CS}$ is the cyclic shift parameter indicating the cyclic shift of a respective reference signal.

Equation (1) together with the definition of $\alpha$ reveals that in total twelve different cyclic shifts ($n_{CS}=0, 1, \ldots, 11$) exist, each resulting in a different reference signal $r^{(\alpha)}(n)$, the different reference signals being orthogonal to each other.

However, in the LTE standard only a 3-bit field is specified to signal the cyclic shift parameter $n_{CS}$ and thus $\alpha$. Since three bits can only be used for representing eight different values, the 3-bit field can only signal eight possible cyclic shifts and thus eight orthogonal reference signals.

Figure 1:
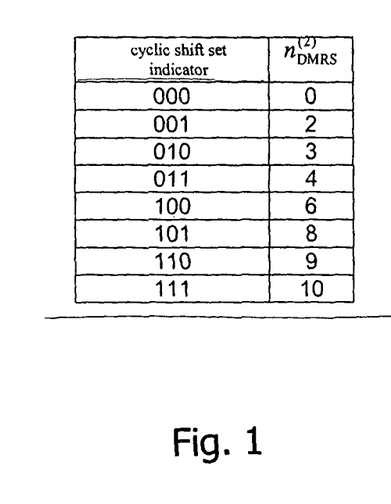
FIG. 1 shows an example of a group of cyclic shift sets according to the prior art.

The cyclic shift parameter $n_{CS}$ is determined according to equation (2):

$$n_{CS} = (n_{DMRS}^{(1)} + n_{DMRS}^{(2)} + n_{PRBS}) \bmod 12, \quad (2)$$

with $n_{DMRS}^{(1)}$ and $n_{PRBS}$ being cell specific parameters and $n_{DMRS}^{(2)}$ being signalled to the UE as part of the UL scheduling grant message. The table shown in FIG. 1 illustrates values of the parameter $n_{DMRS}^{(2)}$ dependent on the signalled values in the 3-bit field. If, for example, the bit field [010] would be signalled, the parameter $n_{DMRS}^{(2)}$ would be set to 3. If, on the other hand, the bit field [110] would be signalled, the parameter $n_{DMRS}^{(2)}$ would be set to 9. As can be seen from the table shown in FIG. 1, only eight different values for $n_{DMRS}^{(2)}$ can be selected. That is, only eight different values for the cyclic shift parameter $n_{CS}$ can be signalled and thus only eight different orthogonal reference signals can be obtained.

One of the targets in LTE-Advanced (LTE-A) is an UL peak data rate of 500 Mb/s. To achieve this data rate, the UL transmission scheme in LTE must be extended to support a wider bandwidth and Single User MIMO (SU-MIMO).

SU-MIMO uses multiple transmitter and receiver antennas at a single mobile terminal to improve the system performance and is a technology which employs the multiple antennas to coherently resolve more information than possible using a single antenna. In addition, SU-MIMO technology relies on multipath signals. Multipath signals are the reflected signals arriving at the receiver some time after the line of sight (LOS) signal transmission has been received. In a non-MIMO based network, multipath signals were perceived as interference degrading a receiver's ability to recover the message information from the signal. In contrast, SU-MIMO uses the diversity of the multipath signal to increase a receiver's ability to recover the message information from the signal.

As mentioned above, another ability the SU-MIMO technology provides is Spatial Multiplexing (SM) using multiple transmit and receive antennas. SM is a transmission technique to independently transmit separately encoded data signals, so-called streams or layers, from each of the multiple transmit antennas within one spectral channel of bandwidth at the same time. Therefore, the space dimension is reused, or multiplexed, more than one time.

SU-MIMO SM can be used with or without precoding. In precoded SU-MIMO SM, one stream is split into a first plurality of substreams, a second stream is split into a second plurality of substreams and so on. Each of the first plurality of substreams, each of the second plurality of substreams and so on can then be transmitted by one of a plurality of transmit antennas. In short, each of a plurality of streams is subdivided into a plurality of substreams, each of which being transmitted by one of a plurality of transmit antennas. Mathematically speaking, this relation can be expressed by equation (3), which shows a multiplication of a precoding matrix $\underline{M}$ with a column vector $\underline{s}$:

$$\underline{M} \times \underline{s} = \begin{pmatrix} M_{11} & M_{12} & \cdots & M_{1s} \\ M_{21} & M_{22} & \ddots & \vdots \\ \vdots & \ddots & \ddots & \vdots \\ M_{a1} & \cdots & \cdots & M_{as} \end{pmatrix} \times \begin{pmatrix} s_1 \\ s_2 \\ \vdots \\ s_s \end{pmatrix} \quad (3)$$

In the matrix $\underline{M}$, the number of rows $a$ is equal to the number of transmit antennas and the number of columns $s$ is equal to the number of streams to be transmitted by the transmit antennas. In order to perform multiplication of the matrix M with the vector s, the number of rows of the vector s have to equal the number of columns of the matrix M. Understandably, the number of transmit antennas can be arbitrarily chosen bearing in mind that the number of transmit antennas should be equal to or greater than the number of streams.

In non-precoded SU-MIMO, one stream is transmitted per antenna. That is, in the specific case of non-precoded SU-MIMO, equation (3) results in equation (4), where the matrix $\underline{M}$ is a diagonal matrix because one stream is not subdivided into substreams but allocated to one transmit antenna:

$$\underline{M} \times \underline{s} = \begin{pmatrix} M_{11} & 0 & \cdots & 0 \\ 0 & M_{22} & \ddots & \vdots \\ \vdots & \ddots & \ddots & \vdots \\ 0 & \cdots & \cdots & M_{as} \end{pmatrix} \times \begin{pmatrix} s_1 \\ s_2 \\ \vdots \\ s_s \end{pmatrix} \quad (4)$$

That is, SU-MIMO SM can significantly increase data throughput as the number of resolvable spatial data streams is increased. In precoded SM, a high rate stream is split into multiple lower rate substreams and each substream is transmitted from a different transmit antenna in the same frequency channel at the same time. If these signals arrive at the receiver antenna array with sufficiently different spatial signatures, the receiver can separate these streams, leading to an increase of the spectral efficiency, which is the information rate that can be transmitted over a given bandwidth (the number of bits per second and per Hz that can be transmitted over the wireless channel). In non-precoded SM, each spatial stream requires a discrete antenna at both the transmitter and the receiver. The spectral efficiency in non-precoded SM is increased by transmitting a plurality of streams from a plurality of transmit antennas at the same time. In both cases, precoded and non-precoded SM, the number of simultaneous data streams is limited by the minimum number of antennas in use on both sides of the link.

SM can be used with or without transmit channel knowledge. If SM with transmit channel knowledge should be used, reference signals are needed to estimate the respective transmission channels. Since SM requires multiple transmit and receiver antennas, multiple transmission channels are provided, wherein for estimation of each of these multiple transmission channels a dedicated reference signals is needed.

Thus, in case of SU-MIMO multiple reference signals need to be transmitted per mobile terminal. Signalling each required cyclic shift independently substantially increases overhead. Furthermore, using the conventional LTE signalling approach discussed above, only eight out of twelve theoretically possible cyclic shifts can be signalled.

SUMMARY

There is a demand for an efficient technique for generating reference signals to be used in Single User Spatial Multiplexing.

This demand is satisfied, according to a first aspect, by a method for generating reference signals used in Single User Spatial Multiplexing between a mobile terminal and an access node in a cellular communication network. The method comprises receiving, by the mobile terminal, a cyclic shift set indicator; selecting, from a group of cyclic shift sets, a cyclic shift set based on the received cyclic shift set indicator, each cyclic shift set comprising at least two parameters each indicating a cyclic shift; and generating, based on at least two parameters of the selected cyclic shift set, at least two orthogonal reference signals for at least two layers of a Single User Spatial Multiplexing transmission scheme to be simultaneously transmitted.

According to a second aspect, the above demand is also satisfied by a further method for generating reference signals used in Single User Spatial Multiplexing between a mobile terminal and an access node in a cellular communication network. The method comprises selecting, from a plurality of groups of cyclic shift sets, a group of cyclic shift sets based on at least one of a transmission rank (the transmission rank being the number of streams to be simultaneously transmitted) and a number of configured antennas of the mobile terminal, each group of cyclic shift sets comprising a plurality of cyclic shift sets; receiving, by the mobile terminal, a cyclic shift set indicator; selecting, from the selected group of cyclic shift sets, a cyclic shift set based on the received cyclic shift set indicator, each cyclic shift set comprising at least one parameter each indicating a cyclic shift; and generating, based on at least one parameter of the selected cyclic shift set, at least one reference signal for one or more layers of a Single User Spatial Multiplexing transmission scheme to be simultaneously transmitted.

The cellular communication network may for example be an LTE or an LTE-Advanced (LTE-A) network. The mobile terminal may be any mobile communication device like a mobile telephone, a Personal Digital Assistant (PDA), a network card or any other mobile communication apparatus which is capable of communicating via an air interface with an access node.

The access node may be any kind of network component which is capable of communicating from the network side with a mobile terminal. The access node may define a cell, cover the cell area of the cell, and serve all mobile terminals associated with the cell. The access node may for example be an eNodeB or a base station being deployed in a mobile communication network working according to the $3^{rd}$ Generation Partnership Project (3GPP) LTE standard.

For performing Spatial Multiplexing, the mobile terminal comprises at least two configured antennas for transmitting at least two streams or substreams at the same time. A data signal to be transmitted by the mobile terminal may be encoded into a plurality of independent streams or layers.

In non-precoded SM, each of these independent layers may then be transmitted from one of the at least two configured transmit antennas within one spectral channel of bandwidth at the same time, i.e. a first layer may be transmitted from a first configured transmit antenna, a second layer may be transmitted concurrently from a second configured transmit antenna and so on. That is, the number of configured transmit antennas may be equal to the number of layers and each configured transmit antenna may be used to simultaneously transmit a single layer. In the latter case, the number of configured antennas of the mobile terminal is equal to the transmission rank, which is the number of layers to be simultaneously transmitted by the mobile terminal. In non-precoded SM it is also conceivable that the number of configured antennas may be different than the transmission rank, for example, the number of configured antennas may be higher than the transmission rank. In the latter case, not every, but only a subset of the configured antennas of the mobile terminal would be used and the number of configured antennas used for transmission would be equal to the transmission rank. Thus, in this case, some of the configured antennas of the mobile terminal would not be used for transmission.

In precoded SM, each of the independent streams may be subdivided into a plurality of substreams, which may then be transmitted from the plurality of configured transmit antennas. Also in this case, the number of configured transmit antennas may be equal to or greater than the number of streams. For example, in case of two transmit antennas, one stream may be subdivided into two substreams for transmission from the two transmit antennas or two streams may each be subdivided into two substreams for transmission from the two transmit antennas. In case of four transmit antennas, the number of streams may be one, two, three or four and each of these streams may be subdivided into four or less substreams for transmission from the four transmit antennas or from a configured subset of the four transmit antennas. By using precoded SM, each of the configured transmit antennas may be used for transmission even if the number of transmit antennas exceeds the number of streams to be simultaneously transmitted because these streams may be subdivided into a plurality of substreams, wherein the number of which may be equal to the number of configured transmit antennas.

According to one realization, the method according to the first aspect may further comprise selecting, from a plurality of groups of cyclic shift sets, a group of cyclic shift sets, each group of cyclic shift sets comprising a plurality of cyclic shift sets. According to this realization, a group of cyclic shift sets is, at first, selected and the selected cyclic shift set is then searched to select a cyclic shift set based on the received cyclic shift set indicator.

According to a first variant of this realization or of the second aspect, the group of cyclic shift sets may be selected based on the number of configured antennas of the mobile terminal. The number of configured antennas of the mobile terminal may be equal to two, three, four, five, six or more and may be known to the mobile terminal. For instance the number of configured antennas is stored in a memory of the mobile terminal and can be retrieved from the memory, in order to select a specific group of cyclic shift sets from the group of cyclic shift sets based on the number of configured antennas. Alternatively, the number of configured antennas may be obtained by the mobile terminal by checking the number of configured antennas that can be used for simultaneous transmission and/or reception. It is also conceivable that the number of configured antennas may be signalled to the mobile terminal and that the mobile terminal selects a group of cyclic shift sets on the basis of the signalled number of antennas.

According to a second variant of this realization or of the second aspect, the group of cyclic shift sets may be determined based on the transmission rank, which may be determined by the mobile terminal. To determine the transmission rank, the mobile terminal may receive a signal indicative of the transmission rank (e.g., from the access node via an uplink scheduling grant message) and may evaluate the received signal in order to determine the transmission rank. Alternatively, the transmission rank may be obtained from a memory of the mobile terminal, where the transmission rank may be (e.g., semistatically) configured. The transmission rank may be equal to one, two, three, four, five, six or more.

Each group of cyclic shift sets may be implemented as a mapping table or another data structure defining a relationship or mapping scheme between an input parameter and an output parameter of the data structure. For example, the group of cyclic shift sets comprises a plurality of different values of the cyclic shift set indicator as the input parameter and a plurality of cyclic shift sets as the output parameter of the data structure or the mapping table, and dependent on the value of the cyclic shift set indicator, a different cyclic shift set of the plurality of cyclic shift sets is selected.

The cyclic shift set indicator used for selecting a cyclic shift set from the plurality of cyclic shift sets contained in each group of cyclic shift sets may be a bit field comprising a plurality of bits, like three or more bits, for example four, five or six bits.

In one implementation, each of the plurality of cyclic shift sets of one group of cyclic shift sets may comprise the same number of parameters. In this implementation, the cyclic shift sets of different groups of cyclic shift sets may comprise a different number of parameters. For selecting a group of cyclic shift sets, the group may be selected such that the number of parameters contained in each cyclic shift set of the selected group is equal to at least one of the determined transmission rank and the number of configured antennas of the mobile terminal. The number of parameters in each of the cyclic shift sets of a group of cyclic shift sets may be equal to one, two, three, four, five, six or more.

For example, in accordance with the second aspect, a first group of cyclic shift sets only comprises cyclic shift sets containing one parameter, a second group of cyclic shift sets only comprises cyclic shift sets containing two parameters, and a third group of cyclic shift sets only comprises cyclic shift sets containing three parameters. This plurality of groups of cyclic shift sets may additionally comprise further groups of cyclic shift sets, e.g., a fourth group of cyclic shift sets only comprising cyclic shift sets containing four parameters. Alternatively, in accordance with the first and second aspect, a first group of cyclic shift sets may only comprise cyclic shift sets containing two parameters, a second group of cyclic shift sets may only comprise cyclic shift sets containing three parameters, and a third group of cyclic shift sets may only comprise cyclic shift sets containing four parameters. If, in the latter example, the determined transmission rank or the number of configured antennas of the mobile terminal or both, the transmission rank and the number of configured antennas, equals two, the first group of cyclic shift sets will be selected by the mobile terminal. If, on the other hand, one or both of the determined transmission rank and the number of configured antennas of the mobile terminal equals three, the second group of cyclic shift sets will be selected in this example. Likewise, the third group will be selected in accordance with this example, if one or both of the determined transmission rank and the number of configured antennas of the mobile terminal equals four, and so on.

As outlined above, the selected cyclic shift set is used for generating orthogonal reference signals for at least one layer of SU-MIMO transmission schemes (second aspect) or for generating orthogonal reference signals for at least two layers of SU-MIMO transmission schemes (first aspect). The parameters contained in the selected cyclic shift set are used for generating the reference signals. For example, each of the parameters contained in the selected cyclic shift set is used to generate a reference signal. In this context, the parameter at the k-th position in the selected cyclic shift set may be used for generating the reference signal that should be used for estimating the propagation channel between the mobile terminal and the access node for transmitting the k-th layer, for example the k-th layer of a SU-MIMO transmission scheme.

The above-mentioned demand is also satisfied, according to a third aspect, by a method for controlling the generation of reference signals used in Single User Spatial Multiplexing between a mobile terminal and an access node in a cellular communication network. The method comprises transmitting, from the access node, a cyclic shift set indicator to the mobile terminal, the cyclic shift set indicator indicating a cyclic shift set comprising at least two parameters each indicating a cyclic shift to be used for the generation of the reference signals.

According to a fourth aspect, the above demand is satisfied by a further method for controlling the generation of reference signals used in Single User Spatial Multiplexing between a mobile terminal and an access node in a cellular communication network. The method comprises transmitting, from the access node, a transmission rank to the mobile terminal for enabling the mobile terminal to select, from a plurality of groups of cyclic shift sets, a group of cyclic shift sets based on the transmission rank, and transmitting, from the access node, a cyclic shift set indicator to the mobile terminal, the cyclic shift set indicator indicating a cyclic shift set in the selected group of cyclic shift sets, the cyclic shift set comprising at least one parameter each indicating a cyclic shift to be used for the generation of the reference signals.

Further, according to a fifth aspect, the above-mentioned demand is satisfied by a computer program product, which comprises program code portions for performing the steps of one or more of the methods and method aspects as described herein when the computer program product is executed on one or more computing devices, for example mobile terminal or an access node. The computer program product may be stored on a computer-readable recording medium, such as a permanent or rewriteable memory within or associated with a computing device or a removable CD-ROM, DVD or USB stick. Additionally or alternatively, the computer program product may be provided for download to a computing device, like the mobile terminal or the access node, for example via a data network such as the Internet or a communication line such as a telephone line or wireless link.

The above demand is further satisfied, according to a sixth aspect, by an apparatus for generating reference signals used in Single User Spatial Multiplexing between a mobile terminal and an access node in a cellular communication network. The apparatus comprises a receiving component adapted to receive a cyclic shift set indicator; a first selector adapted to select, from a group of cyclic shift sets, a cyclic shift set based on the received cyclic shift set indicator, each cyclic shift set comprising at least two parameters each indicating a cyclic shift; and a generator adapted to generate, based on at least two parameters of the selected cyclic shift set, at least two orthogonal reference signals for at least two layers of a Single User Spatial Multiplexing transmission scheme to be simultaneously transmitted.

According to a seventh aspect, the above-mentioned demand is satisfied by a further apparatus for generating reference signals used in Single User Spatial Multiplexing between a mobile terminal and an access node in a cellular communication network. The apparatus comprises a second selector adapted to select, from a plurality of groups of cyclic shift sets, a group of cyclic shift sets based on at least one of a transmission rank and a number of configured antennas of the mobile terminal, each group of cyclic shift sets comprising a plurality of cyclic shift sets; a receiving component adapted to receive a cyclic shift set indicator; a first selector adapted to select, from the selected group of cyclic shift sets, a cyclic shift set based on the received cyclic shift set indicator, each cyclic shift set comprising at least one parameter each indicating a cyclic shift; and a generator adapted to generate, based on at least one parameter of the selected cyclic shift set, at least one reference signal for one or more layers of a Single User Spatial Multiplexing transmission scheme to be simultaneously transmitted.

In one realization, the apparatus according to the sixth aspect may further comprise a second selector adapted to select, from a plurality of groups of cyclic shift sets, a group of cyclic shift sets based on at least one of the transmission rank and the number of configured antennas of the mobile terminal, each group of cyclic shift sets comprising a plurality of cyclic shift sets.

According to a variant of this realization or of the seventh aspect, the apparatus may further comprise a determining component adapted to determine the transmission rank. According to a further variant of this realization or of the seventh aspect, the determining component may be adapted to determine the number of configured antennas of the mobile terminal.

According to further implementations of the apparatus according to the sixth or the seventh aspect, the apparatus or the above described components of the apparatus may be adapted to perform the method as outlined herein.

The above demand is further satisfied, according to an eighth aspect, by an access node for controlling the generation of reference signals used in Single User Spatial Multiplexing between a mobile terminal and the access node in a cellular communication network. The access node comprises a transmitter adapted to transmit a cyclic shift set indicator to the mobile terminal, the cyclic shift set indicator indicating a cyclic shift set comprising at least two parameters each indicating a cyclic shift used for the generation of the reference signals.

According to a ninth aspect, the above-mentioned demand is satisfied by a further access node for controlling the generation of reference signals used in Single User Spatial Multiplexing between a mobile terminal and the access node in a cellular communication network. The access node comprises a transmitter adapted to transmit a transmission rank to the mobile terminal for enabling the mobile terminal to select, from a plurality of groups of cyclic shift sets, a group of cyclic shift sets based on the transmission rank, and adapted to transmit a cyclic shift set indicator to the mobile terminal, the cyclic shift set indicator indicating a cyclic shift set in the selected group of cyclic shift sets, the cyclic shift set comprising at least one parameter each indicating a cyclic shift to be used for the generation of the reference signals.

BRIEF DESCRIPTION OF THE DRAWINGS

In the following, the invention will further be described with reference to embodiments illustrated in the figures, in which.

DETAILED DESCRIPTION

In the following description, for purposes of explanation and not limitation, specific details are set forth, such as particular sequences of steps, components and configurations, in order to provide a thorough understanding of the current invention. It will be apparent to one skilled in the art that the current invention may be practiced in other embodiments that depart from these specific aspects. For example, while the embodiments will be described with reference to a cellular communication network and a mobile terminal which are working according to the 3GPP LTE standard, it will be apparent to the skilled person that the invention can also be practiced in context with cellular communication networks and mobile terminals which are working in accordance with other mobile communication standards.

Moreover, those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the steps of the methods disclosed herein when executed by the processor.

Figure 2:
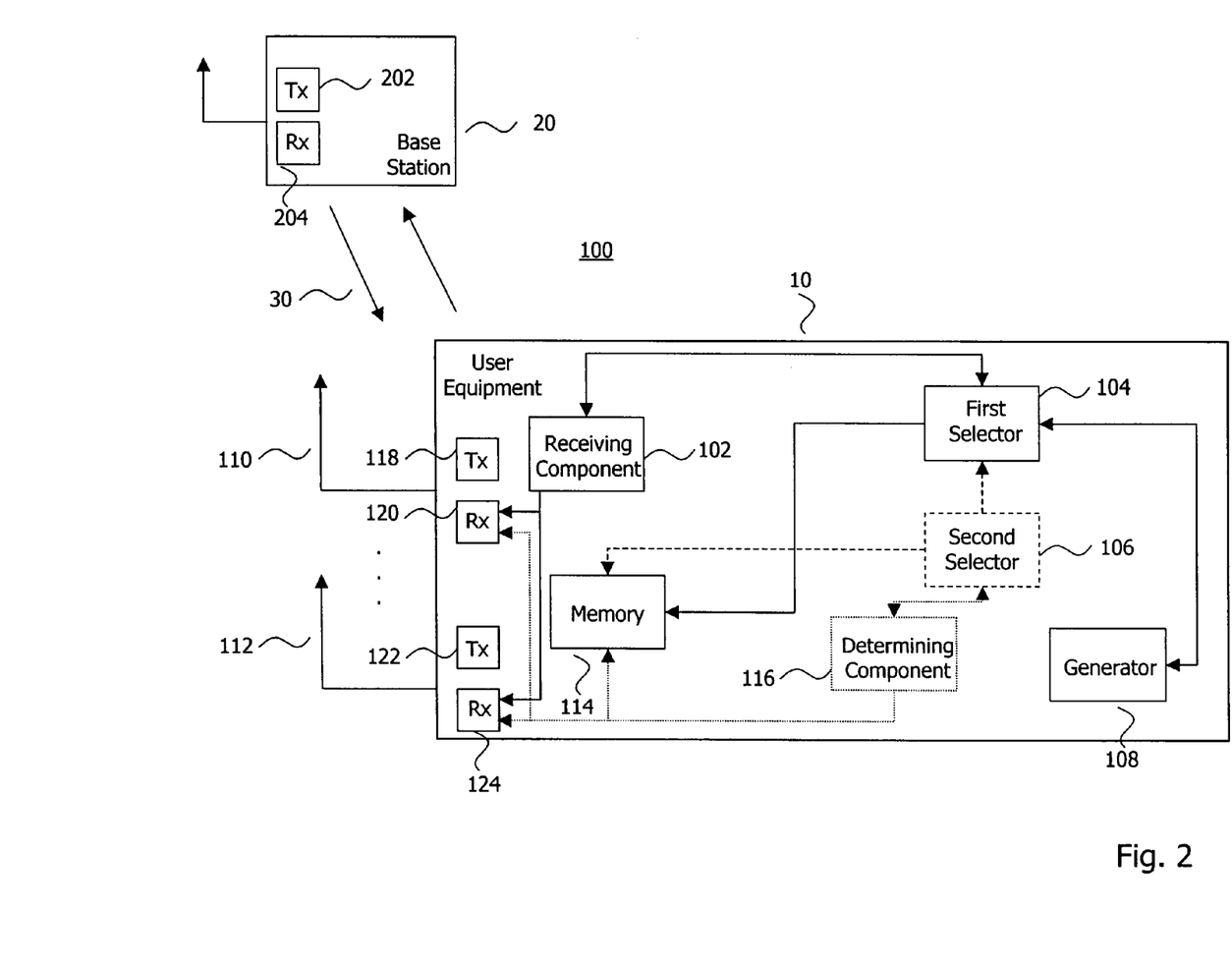
FIG. 2 schematically illustrates a cellular communication network including embodiments of a mobile terminal for generating reference signals used in Single User Spatial Multiplexing and an embodiment of an access node controlling the generation of reference signals used in Single User Spatial Multiplexing.

FIG. 2. schematically illustrates a cellular communication network 100 with different embodiments of an apparatus for generating reference signals used in Single User Spatial Multiplexing. The cellular communication network 100 is a 3GPP LTE or LTE-A network and comprises an access node implemented as an eNodeBs or a Base Station (BS) 20 which is communicating via air interface 30 with a mobile terminal implemented as a User Equipment (UE) 10.

According to a first embodiment shown in FIG. 2 (illustrated by continuous lines), the apparatus for generating reference signals implemented in the UE 10 comprises a receiving component 102, a first selector 104 and a generator 108. The receiving component 102 is adapted to receive, from the BS 20, a cyclic shift set indicator. In this embodiment, the cyclic shift set indicator is received, by the receiving component 102, from the BS 20 via a first 110 or a second configured antenna 112 of the UE 10 and the respective first 120 and second receivers 124 associated with the antennas 110, 112 (for example, by receiving a signal carrying the cyclic shift set indicator). The antennas 110, 112 can be used, in this embodiment, for both transmission and reception of signals, i.e. the antennas 110, 112 are implemented as transceiving antennas. The first selector 104 is adapted to request from and/or receive from the receiving component 102 the cyclic shift set indicator, after the cyclic shift set indicator has been received by the receiving component 102.

In a second embodiment also shown in FIG. 2, the apparatus for generating reference signals implemented in the UE 10 not only comprises the components described above with respect to the first embodiment, but further comprises, as schematically illustrated in FIG. 2 by dashed lines, a second selector 106. The second selector 106 is adapted to select, from a plurality of groups of cyclic shift sets, a group of cyclic shift sets based on the number of configured antennas 110, 112 of the UE 10.

In a third embodiment also shown in FIG. 2, the apparatus for generating reference signals implemented in the UE 10 does not only comprises the components described above with respect to the second embodiment, but further comprises, as schematically illustrated in FIG. 2 by dotted lines, a determining component 116. The determining component 116 is adapted to determine the transmission rank, which is the number of layers of a data signal to be simultaneously transmitted by the UE 10. For this purpose, a data signal to be transmitted by the UE 10 is encoded into a plurality of layers, each of which being transmitted from one of the configured antennas 110, 112 within one spectral channel of bandwidth at the same time. According to the third embodiment, the second selector 106 is not adapted to select the group of cyclic shift sets based on the number of configured antennas 110, 112 (like in the second embodiment), but is adapted to select the group of cyclic shift sets based on the determined transmission rank determined by the determining component 116.

Figure 3A:
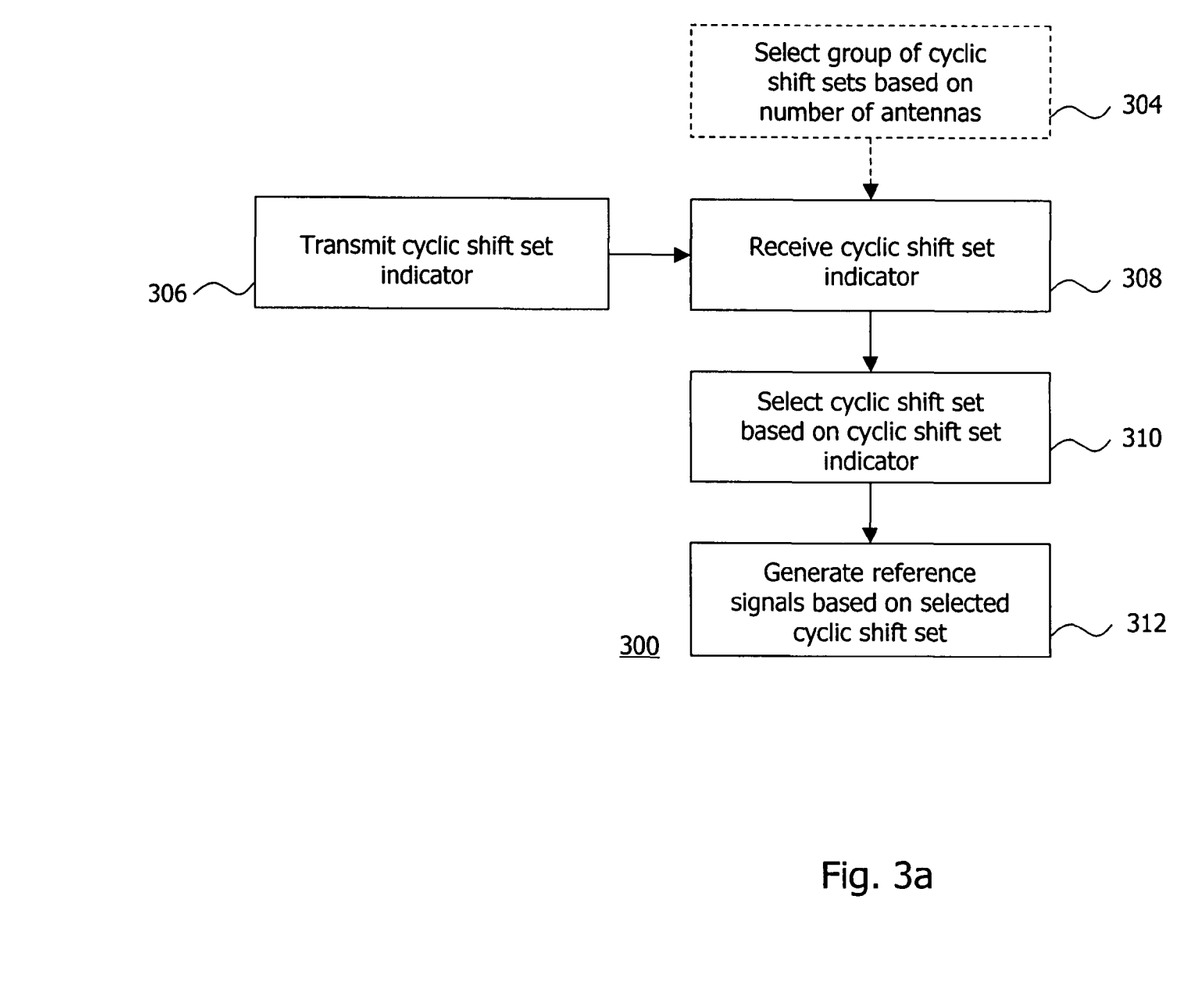
FIGS. 3a, 3b are flow diagrams illustrating various modes of operation of the apparatus embodiments of FIG. 2.
Figure 3B:
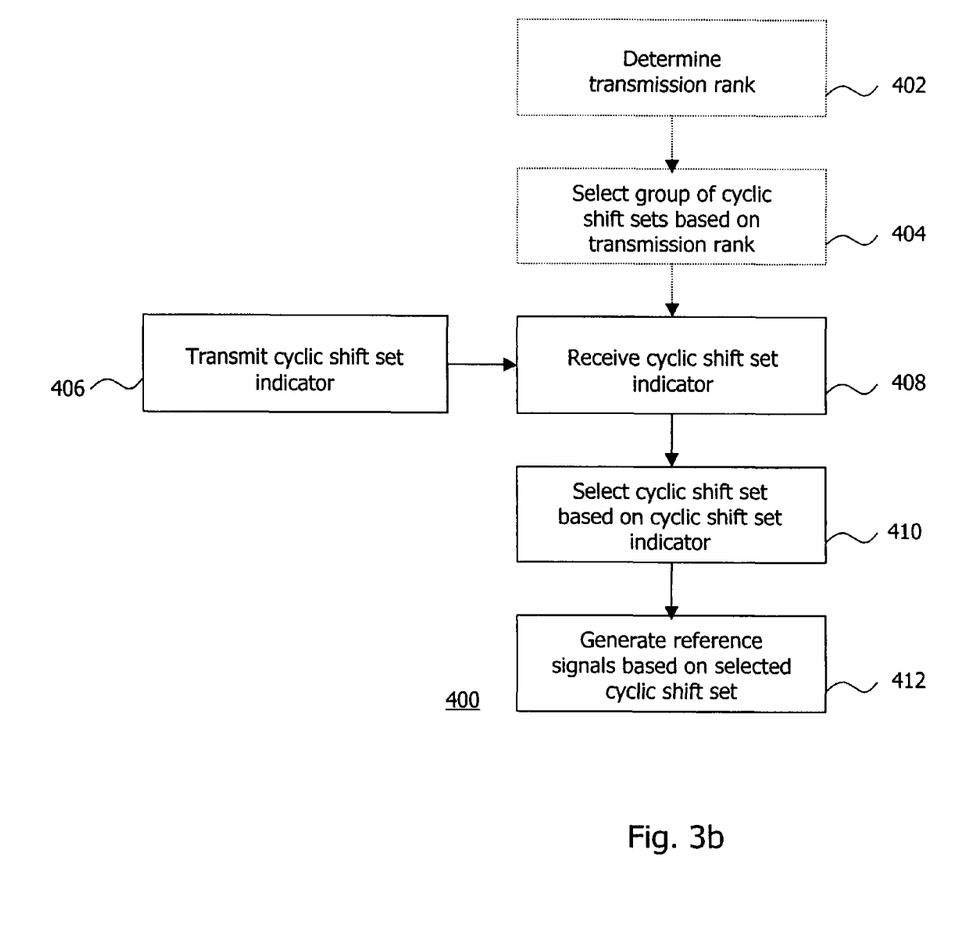

The operation of the various embodiments of the apparatus for generating reference signals shown in FIG. 2 will now be jointly described in some more detail with reference to the flow diagrams of FIGS. 3a and 3b in combination with the exemplary implementation of the groups of cyclic shift sets as shown in FIGS. 1 and 4a to 4c.

FIGS. 3a and 3b show flow diagrams illustrating methods for generating reference signals used in Single User Spatial Multiplexing (e.g., in SU-MIMO) between the UE 10 and the BS 20 in the cellular communication network 100 by means of the various embodiments of the apparatus for generating reference signals of FIG. 2.

As illustrated by the continuous lines in FIGS. 3a and 3b, steps 306 to 312 in FIG. 3a and steps 406 to 412 in FIG. 3b are related to the first embodiment of the apparatus of FIG. 2, which is also illustrated by continuous lines. Similarly, the additional step 304 in FIG. 3a (illustrated by dashed lines) is related to the second embodiment of the apparatus shown in FIG. 2, which additionally comprises the second selector 106 (illustrated by dashed lines). The additional steps 402 and 404 in FIG. 3b (illustrated by dotted lines) are related to the third embodiment of the apparatus shown in FIG. 2, which, in addition to the components illustrated by the continuous lines and the second selector 106 illustrated by dashed lines, comprises the determining component 116 (illustrated by dotted lines).

Figure 4A:
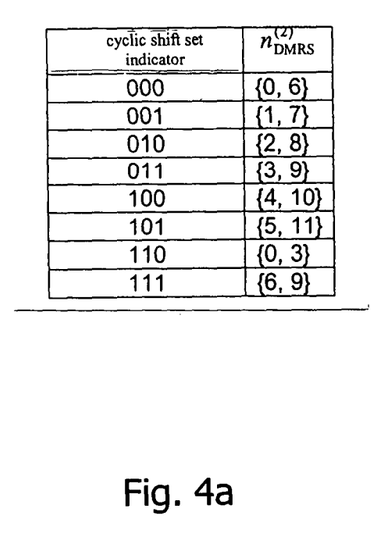
FIGS. 4a to 4c show examples of groups of cyclic shift sets each comprising a plurality of cyclic shift sets for use by the embodiments of the apparatus shown in FIG. 2.
Figure 4B:
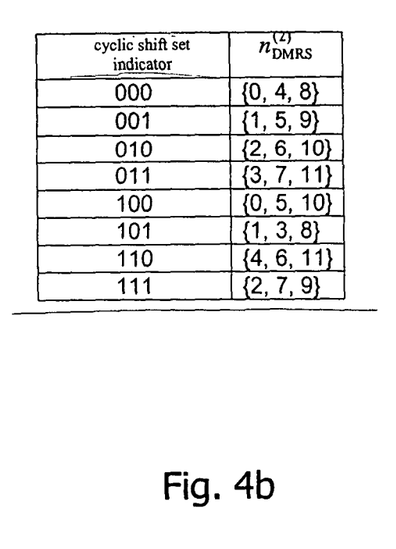
Figure 4C:
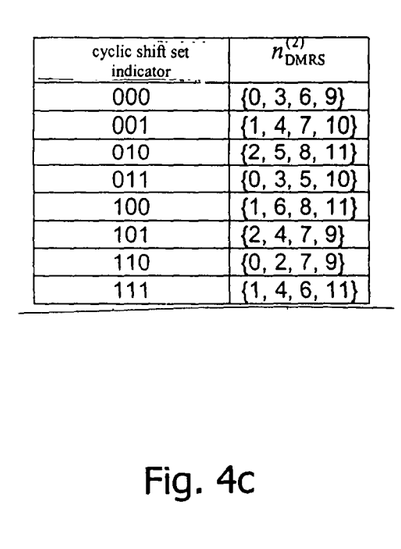

FIGS. 4a to 4c illustrate exemplary mapping tables comprising groups of cyclic shift sets. Each mapping table contains eight different values of the cyclic shift set indicator in the left column and eight different cyclic shift sets in the right column. The cyclic shift set indicator is realized as a bit field containing three bits. The number of cyclic shift sets may be adapted in accordance with the number of bits of the cyclic shift set indicator. For example, if an l-bit bit field would be used as the cyclic shift set indicator, the mapping tables would contain $2^l$ different cyclic shift sets.

The groups of cyclic shift sets in the mapping tables of FIGS. 4a to 4c form an exemplary plurality of groups of cyclic shift sets implemented as a plurality of mapping tables containing three mapping tables, namely a first mapping table (FIG. 4a), a second mapping table (FIG. 4b), and a third mapping table (FIG. 4c). Each of the mapping tables contains eight different values of the cyclic shift set indicator in the left column and eight different cyclic shift sets in the right column.

Each of the cyclic shift sets in the first mapping table contains the same number of parameters, in the present exemplary implementation two parameters. Likewise, each of the cyclic shift sets in the second mapping table contains the same number of parameters, in the present exemplary realization three parameters, and each of the cyclic shift sets in the third mapping table contains the same number of parameters, in the present exemplary implementation four parameters. As exemplarily shown in FIGS. 4a to 4c, the cyclic shift sets in different groups of cyclic shift sets contain a different number of parameters. That is, the cyclic shift sets in the first mapping table contain a different number of parameters than the cyclic shift sets in the second and the third mapping tables. Further, the cyclic shift sets in the second mapping table contain a different number of parameters than the cyclic shift sets in the third mapping table.

Steps 306 to 312 of the flow diagram shown in FIG. 3a illustrate the method for generating reference signals by the first embodiment of the apparatus of FIG. 2.

Before performing steps 306 to 312 in the method related to the first embodiment of the apparatus shown in FIG. 2, the method performed by the second embodiment of the apparatus shown in FIG. 2 comprises the additional step 304. In step 304, the second selector 106 selects one of the groups of cyclic shift sets from the plurality of groups of cyclic shift sets (exemplarily shown in FIGS. 4a to 4c) based on the number of configured antennas 110, 112 of the UE 10. As shown exemplarily in FIG. 2, the number of configured antennas 110, 112 is equal to two. The second selector 106 searches the plurality of groups of cyclic shift sets and selects a specific group of cyclic shift sets only comprising cyclic shift sets having a certain number of parameters being equal to the number of configured antennas 110, 112 (step 304). In the present example, the second selector 106 selects the specific group of cyclic shift sets only containing cyclic shift sets having two parameters each indicating a cyclic shift.

As stated above, when selecting one of the three exemplary groups of cyclic shift sets in step 304, the group of cyclic shift sets are selected such that the number of parameters contained in each cyclic shift set of the selected group of cyclic shift sets is equal to the number of configured antennas 110, 112 of the UE 10 (step 304). If, like in the present example illustrated in FIG. 2, the UE 10 comprises two configured antennas 110, 112, the second selector 106 selects the first group of cyclic shift sets, shown in FIG. 4a, because the number of configured antennas of two equals the number of parameters in each of the cyclic shift sets contained in the first group of cyclic shift sets. As illustrated in FIG. 2 by the dots between the antennas 110, 112, the UE 10 may also comprise more than two configured antennas 110, 112, like three or four configured antennas. In the first case (when the number of configured antennas is three), the second selector 106 would select the second group of cyclic shift sets, shown in FIG. 4b, only having cyclic shift sets containing three parameters, whereas in the latter case (when the transmission rank is four), the second selector 106 would select the third group of cyclic shift sets, shown in FIG. 4c, only having cyclic shift sets containing four parameters.

In step 306, which is performed in both, the method related to the first and second embodiment of the apparatus shown in FIG. 2, the BS 20 transmits a cyclic shift set indicator to the UE 10 via the air interface 30. The receiving component 102 receives the cyclic shift set indicator from the BS 20 (step 308) and the first selector 104 searches the group of cyclic shift sets that was previously selected in step 304 by the second selector 106.

The first selector 104 searches the previously selected group of cyclic shift sets by considering the received cyclic shift set indicator and selects a specific cyclic shift set from a plurality of cyclic shift sets contained in the selected group of cyclic shift sets based on the received cyclic shift set indicator (step 310). As exemplarily shown in FIGS. 4a to 4c, each of the different values of the cyclic shift set indicator (in the left column) is associated with a specific cyclic shift set (in the right column) and the first selector 104 is adapted to select the cyclic shift set associated with the value of the received cyclic shift set indicator.

If, for example, the first group of cyclic shift sets shown in FIG. 4a has been selected by the second selector 106 in step 304, the first selector 104 searches the first group of cyclic shift sets by considering the received cyclic shift set indicator, in this implementation being a bit field containing three bits. The first selector 104 selects the specific cyclic shift set in the first group of cyclic shift sets associated with the value of the received cyclic shift set indicator. For example, the first selector 104 would select the cyclic shift set {0,6} if the bit field [000] has been received as the value of the cyclic shift set indicator. Alternatively, the cyclic shift set {1,7} would be selected if the received cyclic shift set indicator is [001] and so on.

If the second or third group of cyclic shift sets has been previously selected by the second selector 106 in step 304, the first selector 104 would only search the second or third group, respectively, by considering the received cyclic shift set indicator. In case the second group has been selected by the second selector 106 and the received cyclic shift set is [011], the first selector would select {3,7,11} as the cyclic shift set. If, however, the third group has been selected by the second selector 106 and the received cyclic shift set indicator corresponds to [101], the first selector 104 would select the cyclic shift set {2,4,7,9} from the third group of cyclic shift sets.

After selecting the cyclic shift set in step 310, the generator 108 requests or receives the selected cyclic shift set or the parameters contained in the selected cyclic shift set and generates orthogonal reference signals based on the selected cyclic shift set or the parameters contained in the selected cyclic shift set (step 312). If, for instance, the selected cyclic shift set contains two parameters, the generator would generate a first reference signal on the basis of one of the two parameters and would generate a second reference signal, orthogonal to the first reference signal, on the basis of the other of the two parameters.

As outlined above, the generator 108 receives the selected cyclic shift set from the first selector 104 and generates orthogonal reference signals for two or more layers of, for example, a SU-MIMO transmission scheme to be simultaneously transmitted. If, for example, the selected cyclic shift set is {1,7} comprising the two parameters {1} and {7}, the generator 108 would generate two orthogonal reference signals using the two parameters {1} and {7} of the selected cyclic shift set. For generating the reference signals, the generator 108, at first, calculates the cyclic shift parameters $n_{CS}$ for each of the reference signals to be generated using equation (2). By means of this equation a first cyclic shift parameter $n_{CS}$ for generating the first reference signal is determined by using the first parameter of the selected cyclic shift set (in case of a selected cyclic shift set of {1,7}, the first parameter would be {1}) as an input value $n_{DMRS}^{(2)}$ of equation (2). The further parameters of equation (2), $n_{DMRS}^{(1)}$ and $n_{PRBS}$ are cell specific parameters, wherein $n_{PRBS}$ is a pseudo random parameter in order to randomize the cyclic shifts in different cells.

After calculating the first cyclic shift parameter $n_{CS}$, the generator 108 generates the first reference signal using equation (1) and the first cyclic shift parameter $n_{CS}$. For calculating the second cyclic shift parameter $n_{CS}$, equation (2) is used with the second value of the selected cyclic shift set, in the present example {7}, as the input value $n_{DMRS}^{(2)}$. Then, the second reference signal is calculated using equation (1) and the calculated value of the second cyclic shift parameter $n_{CS}$ as one of the input values of equation (1).

In this example, the first parameter in the selected cyclic shift set is used by the generator 108 to generate the reference signal to be transmitted from the configured antenna 110, 112 that transmits the first layer of the SU-MIMO transmission scheme. Likewise, the second parameter in the selected cyclic shift set is used to generate the reference signal to be transmitted from the configured antenna 110, 112 that transmits the second layer of the SU-MIMO transmission scheme. That is, the parameter at the k-th position in the selected cyclic shift set is used to generate the reference signal that should be used for estimating the propagation channel which is used from those configured antennas 110, 112 that transmit the k-th layer of the SU-MIMO transmission scheme. Alternatively, the first parameter can be used to generate the second reference signal and the second parameter can be used to generate the first reference signal.

Another exemplary method for generating reference signals by the embodiments of the apparatus shown in FIG. 2 is explained with respect to the flow diagram of FIG. 3b. Before performing steps 406 to 412 according to the method related to the first apparatus embodiment shown in FIG. 2, the method performed by the third apparatus embodiment of FIG. 2 comprises the additional steps 402 and 404. The steps 406 to 412 in FIG. 3b correspond to the steps 306 to 312 in FIG. 3a.

In the method illustrated by FIG. 3b, the second selector 106 selects the group of cyclic shift sets by comparing the number of parameters contained in the cyclic shift sets of each group of cyclic shift sets with the transmission rank (step 404), instead of selecting the group of cyclic shift sets based on the number of configured antennas 110, 112 of the UE 10 (step 304). According to this method, the second selector 106 selects the first group if the transmission rank is equal to two, selects the second group if the transmission rank equals three and selects the third group if the transmission rank equals four.

As outlined above, in addition to steps 406 to 412, steps 402 and 404 are performed by the third apparatus embodiment of FIG. 2. In step 402, the determining component 116 determines the transmission rank by receiving a signal indicative of the transmission rank from the BS 20 via an uplink scheduling grant message. Alternatively, the transmission rank can be obtained from the memory 114 of the UE 10, where the transmission rank is semistatically configured.

After determining the transmission rank in step 402, the second selector 106 selects, in step 404, a group of cyclic shift sets from the plurality of groups of cyclic shift sets (shown exemplarily in FIGS. 4a to 4c) based on the determined transmission rank determined by the determining component 116 in step 402. The second selector 106 selects a specific group of cyclic shift sets, which comprises cyclic shift sets having a specific number of parameters corresponding to the indicated transmission rank.

When selecting one of the three exemplary groups of cyclic shift sets in step 404, the group of cyclic shift sets is selected such that the number of parameters contained in each cyclic shift set of the selected group of cyclic shift sets is equal to the determined transmission rank (step 404). If, for example, a transmission rank of two is determined by the determining component 116, the second selector 106 selects the first group of cyclic shift sets, shown in FIG. 4a, because the determined transmission rank of two equals the number of parameters contained in each of the cyclic shift sets of the first group of cyclic shift sets. If, however, a transmission rank of three is determined, the second selector 106 would select the second group of cyclic shift sets, shown in FIG. 4b, only having cyclic shift sets containing three parameters, whereas in case a transmission rank of four is determined, the second selector 106 would select the third group of cyclic shift sets, shown in FIG. 4c, only having cyclic shift sets containing four parameters.

Afterwards, the steps 406 to 412 as described above with respect to steps 306 to 312 are performed, wherein the cyclic shift set is selected from the group of cyclic shift sets, which has been selected in step 404 based on the determined transmission rank.

In step 406, the BS 20 transmits a cyclic shift set indicator to the UE 10. The receiving component 102 of the UE 10 then receives the cyclic shift set indicator from the BS 20 (step 408). After the receiving component 102 has received the cyclic shift set indicator, the first selector 104 uses the received cyclic shift set indicator to select a cyclic shift set from the selected group of cyclic shift sets (step 410), each cyclic shift set of the group of cyclic shift sets comprising two or more parameters, each of which indicating a cyclic shift.

If, for example, the first group of cyclic shift sets shown in FIG. 4a has been selected by the second selector 106 in step 404 (because of a determined transmission rank of two), the first selector 104 searches the first group of cyclic shift sets by considering the received cyclic shift set indicator. For example, the first selector 104 would select the cyclic shift set {5,11} if the bit field [101] has been received as the cyclic shift set indicator. Alternatively, the cyclic shift set {6,9} would be selected if the received cyclic shift set indicator is [111] and so on.

If the second or third group of cyclic shift sets has been previously selected by the second selector 106 in step 404, the first selector 104 would only search the second or third group, respectively, by considering the received cyclic shift set indicator. In case the second group has been selected by the second selector 106 and the received cyclic shift set is [110], the first selector would select {4,6,11} as the cyclic shift set. If, however, the third group has been selected by the second selector 106 and the received cyclic shift set indicator corresponds to [100], the first selector 104 would select the cyclic shift set {1,6,8,11} from the third group of cyclic shift sets.

Then, in step 412, the generator 108 generates two or more orthogonal reference signals for two or more layers of a SU-MIMO transmission scheme to be simultaneously transmitted.

If, for example, the selected cyclic shift set is {5,11} comprising the two parameters {5} and {11}, the generator 108 would generate two orthogonal reference signals using the two parameters {5} and {11} of the selected cyclic shift set.

As can be seen from FIGS. 4a to 4c, some values of $n_{DMRS}^{(2)}$ may be members of several sets. This allows more flexibility when having in a cell multiple terminals transmitting simultaneously on the same time-frequency resources with different transmission ranks.

If a cyclic shift set containing three parameters has been selected from the second group (FIG. 4b) or a cyclic shift set containing four parameters has been selected from the third group (FIG. 4c), three or four reference signals may be generated by the generator 108 using equations 1 and 2 in a similar manner as outlined above.

In this way, two, three, four or more orthogonal reference signals can be generated in a very efficient manner. This is because dependent on the indicated transmission rank or the number of configured antennas, the cyclic shift set indicator, for example being a 3-bit bit field, may not only indicate a single cyclic shift as in the table shown in FIG. 1, but may indicate a set of cyclic shifts, like a cyclic shift set containing two (FIG. 4a), three (FIG. 4b), four (FIG. 4c) or more cyclic shift parameters. Further, as shown in the tables illustrated in FIGS. 4a to 4c, some cyclic shift sets may contain values for $n_{DMRS}^{(2)}$ that are not used in the mapping table illustrated in FIG. 1. This also increases flexibility of cyclic shift assignments without increasing signalling overhead.

Since the transmission rank or the number of configured antennas does not determine only a single cyclic shift or a part of a cyclic shift set, but determines a whole set of cyclic shift parameters used for generating a whole set of reference signals, signalling overhead can be efficiently decreased. That is, the required signalling overhead for determining a plurality of cyclic shift parameters for generating a plurality of orthogonal reference signals can be significantly reduced.

The steps 402 to 412 in FIG. 3b performed by the third apparatus embodiment in FIG. 2 may, alternatively to the plurality of groups of cyclic shift sets exemplarily implemented by the mapping tables shown in FIGS. 4a to 4c, make use of a different plurality of groups of cyclic shift sets exemplarily implemented by the mapping tables shown in FIGS. 1 and 4a to 4c. In this case, the plurality of groups of cyclic shift sets comprises four mapping tables as the groups of cyclic shift sets, namely as the first group of cyclic shift sets the mapping table shown in FIG. 1, as the second group of cyclic shift sets the mapping table shown in FIG. 4a, as the third group of cyclic shift sets the mapping table shown in FIG. 4b and as the fourth group of cyclic shift sets the mapping table shown in FIG. 4c. Each of the plurality of cyclic shift sets contained in the first group of cyclic shift sets of FIG. 1 contains only a single parameter.

When using the four mapping tables of FIGS. 1 and 4a to 4c as the plurality of groups of cyclic shift sets, also a transmission rank (determined in step 402) equal to one can be used to select a certain group of cyclic shift sets in step 404. In this way, the mapping table of FIG. 1 used for MU-MIMO can be reused for the generation of reference signals. For example, if a transmission rank of two or greater is received or determined in step 402, one of the mapping tables of FIGS. 4a to 4c would be selected in the same way as described above. Only when a transmission rank of one is determined, the additional mapping table shown in FIG. 1 would be selected. Thus, the above-mentioned advantages also apply in the case when using the four mapping tables shown in FIGS. 1 and 4a to 4c. In addition to the above advantages, the mapping table of FIG. 1 can be reused.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for generating reference signals used in Single User Spatial Multiplexing between a mobile terminal and an access node in a cellular communication network, the method comprising:
receiving, by the mobile terminal, a cyclic shift set indicator;
selecting, from a group of cyclic shift sets of a plurality of groups of cyclic shift sets, a cyclic shift set based on the received cyclic shift set indicator, each cyclic shift set comprising at least two parameters, wherein each parameter indicates a cyclic shift and wherein the cyclic shift sets of different groups of cyclic shift sets comprise a different number of parameters; and
generating, based on at least two parameters of the selected cyclic shift set, at least two orthogonal reference signals for at least two layers of a Single User Spatial Multiplexing transmission scheme to be simultaneously transmitted.

2. The method of claim 1, further comprising selecting, from a plurality of groups of cyclic shift sets, a group of cyclic shift sets based on at least one of a transmission rank, being the number of layers to be simultaneously transmitted, and a number of configured antennas of the mobile terminal, each group of cyclic shift sets comprising a plurality of cyclic shift sets.

3. The method of claim 1, wherein the cyclic shift set indicator comprises i≥3 bits, i∈N.

4. The method of claim 1, wherein the parameter at the k-th position in the selected cyclic shift set is used for generating the reference signal to be used for estimating the propagation channel between the mobile terminal and the access node for transmitting the k-th layer.

5. A method for generating reference signals used in Single User Spatial Multiplexing between a mobile terminal and an access node in a cellular communication network, the method comprising:
selecting, from a plurality of groups of cyclic shift sets, a group of cyclic shift sets based on at least one of a transmission rank and a number of configured antennas of the mobile terminal, each group of cyclic shift sets comprising a plurality of cyclic shift sets;
receiving, by the mobile terminal, a cyclic shift set indicator;
selecting, from the selected group of cyclic shift sets, a cyclic shift set based on the received cyclic shift set indicator, each cyclic shift set comprising at least one parameter, wherein each parameter indicates a cyclic shift and wherein the cyclic shift sets of different groups of cyclic shift sets comprise a different number of parameters; and
generating, based on at least one parameter of the selected cyclic shift set, at least one reference signal for one or more layers of a Single User Spatial Multiplexing transmission scheme to be simultaneously transmitted.

6. The method of claim 5, further comprising receiving, by the mobile terminal, a signal indicative of the transmission rank via an uplink scheduling grant message or obtaining, by the mobile terminal, the transmission rank from a memory of the mobile terminal, where the transmission rank is configured in the mobile terminal.

7. The method of claim 5, wherein the transmission rank is m≥1, m∈N, and the number of configured antennas of the mobile terminal is n≥2, n∈N.

8. The method of claim 5, wherein each of the plurality of cyclic shift sets of one group of cyclic shift sets comprises the same number of parameters.

9. The method of claim 8, wherein the step of selecting a group of cyclic shift sets comprises selecting the group such that the number of parameters contained in each cyclic shift set of the selected group is equal to at least one of the determined transmission rank and the number of configured antennas of the mobile terminal.

10. A method for controlling the generation of reference signals used in Single User Spatial Multiplexing between a mobile terminal and an access node in a cellular communication network, the method comprising transmitting, from the access node, a cyclic shift set indicator to the mobile terminal, the cyclic shift set indicator indicating a cyclic shift set contained in a group of cyclic shift sets of a plurality of groups of cyclic shift sets, wherein the cyclic shift set comprises at least two parameters, wherein each parameter indicates a cyclic shift to be used for the generation of the reference signals and wherein the cyclic shift sets of different groups of cyclic shift sets comprise a different number of parameters.

11. A method for controlling the generation of reference signals used in Single User Spatial Multiplexing between a mobile terminal and an access node in a cellular communication network, the method comprising transmitting, from the access node, a transmission rank to the mobile terminal for enabling the mobile terminal to select, from a plurality of groups of cyclic shift sets, a group of cyclic shift sets based on the transmission rank, and transmitting, from the access node, a cyclic shift set indicator to the mobile terminal, the cyclic shift set indicator indicating a cyclic shift set in the selected group of cyclic shift sets, the cyclic shift set comprising at least one parameter, wherein each parameter indicates a cyclic shift to be used for the generation of the reference signals and wherein the cyclic shift sets of different groups of cyclic shift sets comprise a different number of parameters.

12. A computer program product comprising a non-transitory computer readable medium encoded thereon program code portions for performing the steps of claim 1 when the computer program product is run on a computer system.

13. An apparatus for generating reference signals used in Single User Spatial Multiplexing between a mobile terminal and an access node in a cellular communication network, the apparatus comprising:
- a receiving component configured to receive a cyclic shift set indicator;
- a first selector configured to select, from a group of cyclic shift sets of a plurality of groups of cyclic shift sets, a cyclic shift set based on the received cyclic shift set indicator, each cyclic shift set comprising at least two parameters, wherein each parameter indicates a cyclic shift and wherein the cyclic shift sets of different groups of cyclic shift sets comprise a different number of parameters; and
- a generator configured to generate, based on at least two parameters of the selected cyclic shift set, at least two orthogonal reference signals for at least two layers of a Single User Spatial Multiplexing transmission scheme to be simultaneously transmitted.

14. The apparatus of claim 13, further comprising a second selector configured to select, from a plurality of groups of cyclic shift sets, a group of cyclic shift sets based on at least one of a transmission rank, being the number of layers to be simultaneously transmitted, and a number of configured antennas of the mobile terminal, each group of cyclic shift sets comprising a plurality of cyclic shift sets.

15. The apparatus of claim 13, wherein the cyclic shift set indicator comprises $i \geq 3$ bits, $i \in N$.

16. The apparatus of claim 13, wherein the parameter at the k-th position in the selected cyclic shift set is used for generating the reference signal to be used for estimating the propagation channel between the mobile terminal and the access node for transmitting the k-th layer.

17. An apparatus for generating reference signals used in Single User Spatial Multiplexing between a mobile terminal and an access node in a cellular communication network, the apparatus comprising:
- a second selector configured to select, from a plurality of groups of cyclic shift sets, a group of cyclic shift sets based on at least one of a transmission rank and a number of configured antennas of the mobile terminal, each group of cyclic shift sets comprising a plurality of cyclic shift sets;
- a receiving component configured to receive a cyclic shift set indicator;
- a first selector configured to select, from the selected group of cyclic shift sets, a cyclic shift set based on the received cyclic shift set indicator, each cyclic shift set comprising at least one parameter, wherein each parameter indicates a cyclic shift and wherein the cyclic shift sets of different groups of cyclic shift sets comprise a different number of parameters; and
- a generator configured to generate, based on at least one parameter of the selected cyclic shift set, at least one reference signal for one or more layers of a Single User Spatial Multiplexing transmission scheme to be simultaneously transmitted.

18. The apparatus of claim 17, wherein the apparatus is configured to receive the transmission rank via an uplink scheduling grant message or to obtain the transmission rank from a memory of the mobile terminal, where the transmission rank is configured in the mobile terminal.

19. The apparatus of claim 17, wherein the transmission rank is $m \geq 1$, $m \in N$, and the number of configured antennas of the mobile terminal is $n \geq 2$, $n \in N$.

20. The apparatus of claim 17, wherein each of the plurality of cyclic shift sets of one group of cyclic shift sets comprises the same number of parameters.

21. The apparatus of claim 20, wherein the second selector is further configured to, when selecting a group of cyclic shift sets, select the group such that the number of parameters contained in each cyclic shift set of the selected group is equal to at least one of the determined transmission rank and the number of configured antennas of the mobile terminal.

22. An access node for controlling the generation of reference signals used in Single User Spatial Multiplexing between a mobile terminal and the access node in a cellular communication network, wherein the access node comprises a transmitter configured to transmit a cyclic shift set indicator to the mobile terminal, the cyclic shift set indicator indicating a cyclic shift set contained in a group of cyclic shift sets of a plurality of groups of cyclic shift sets, wherein the cyclic shift set comprises at least two parameters, wherein each parameter indicates a cyclic shift to be used for the generation of the reference signals and wherein the cyclic shift sets of different groups of cyclic shift sets comprise a different number of parameters.

23. An access node for controlling the generation of reference signals used in Single User Spatial Multiplexing between a mobile terminal and the access node in a cellular communication network, wherein the access node comprises a transmitter configured to transmit a transmission rank to the mobile terminal for enabling the mobile terminal to select, from a plurality of groups of cyclic shift sets, a group of cyclic shift sets based on the transmission rank, and configured to transmit a cyclic shift set indicator to the mobile terminal, the cyclic shift set indicator indicating a cyclic shift set in the selected group of cyclic shift sets, the cyclic shift set comprising at least one parameter, wherein each parameter indicates a cyclic shift to be used for the generation of the reference signals and wherein the cyclic shift sets of different groups of cyclic shift sets comprise a different number of parameters.

* * * * *